Patented Mar. 7, 1933

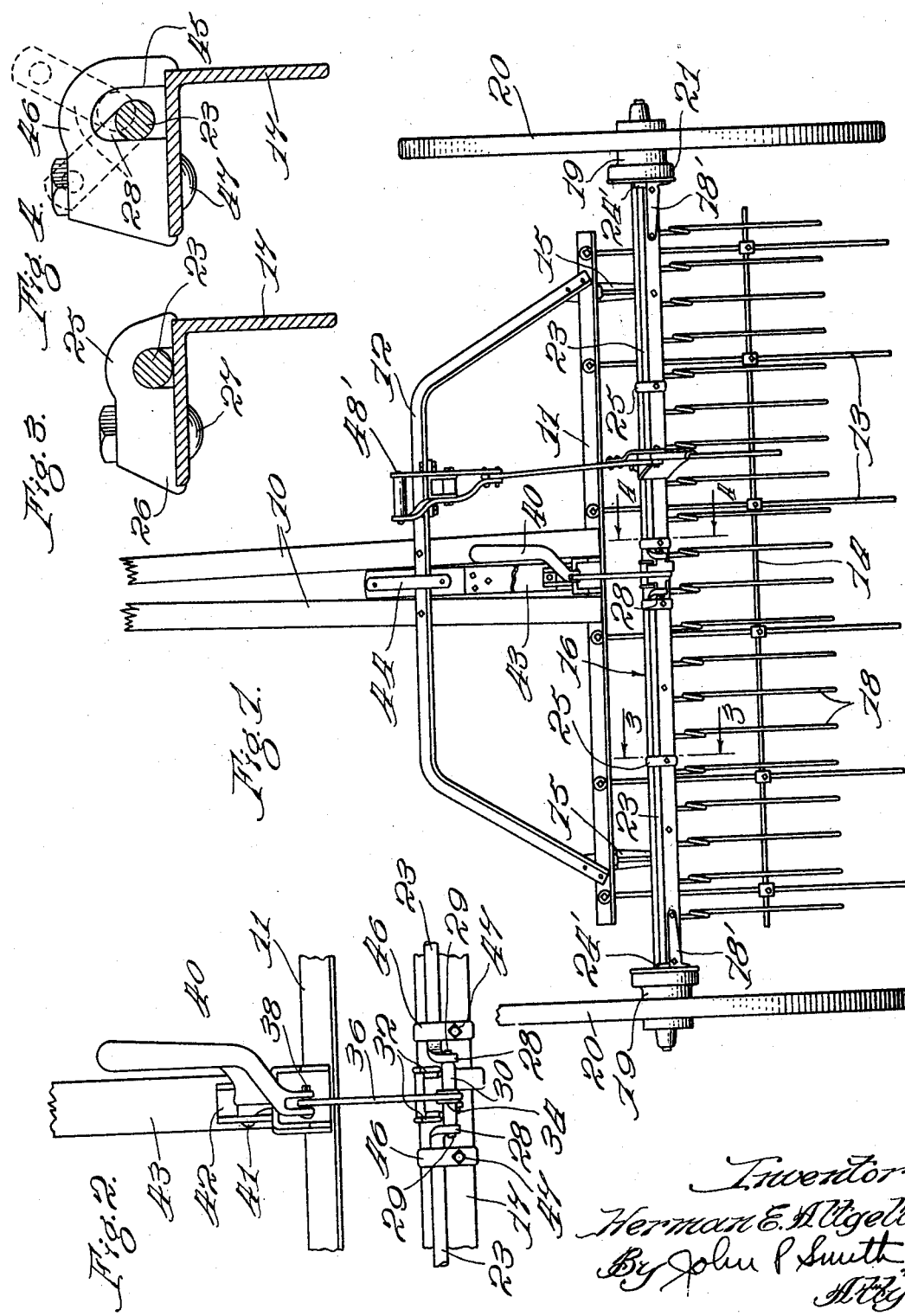

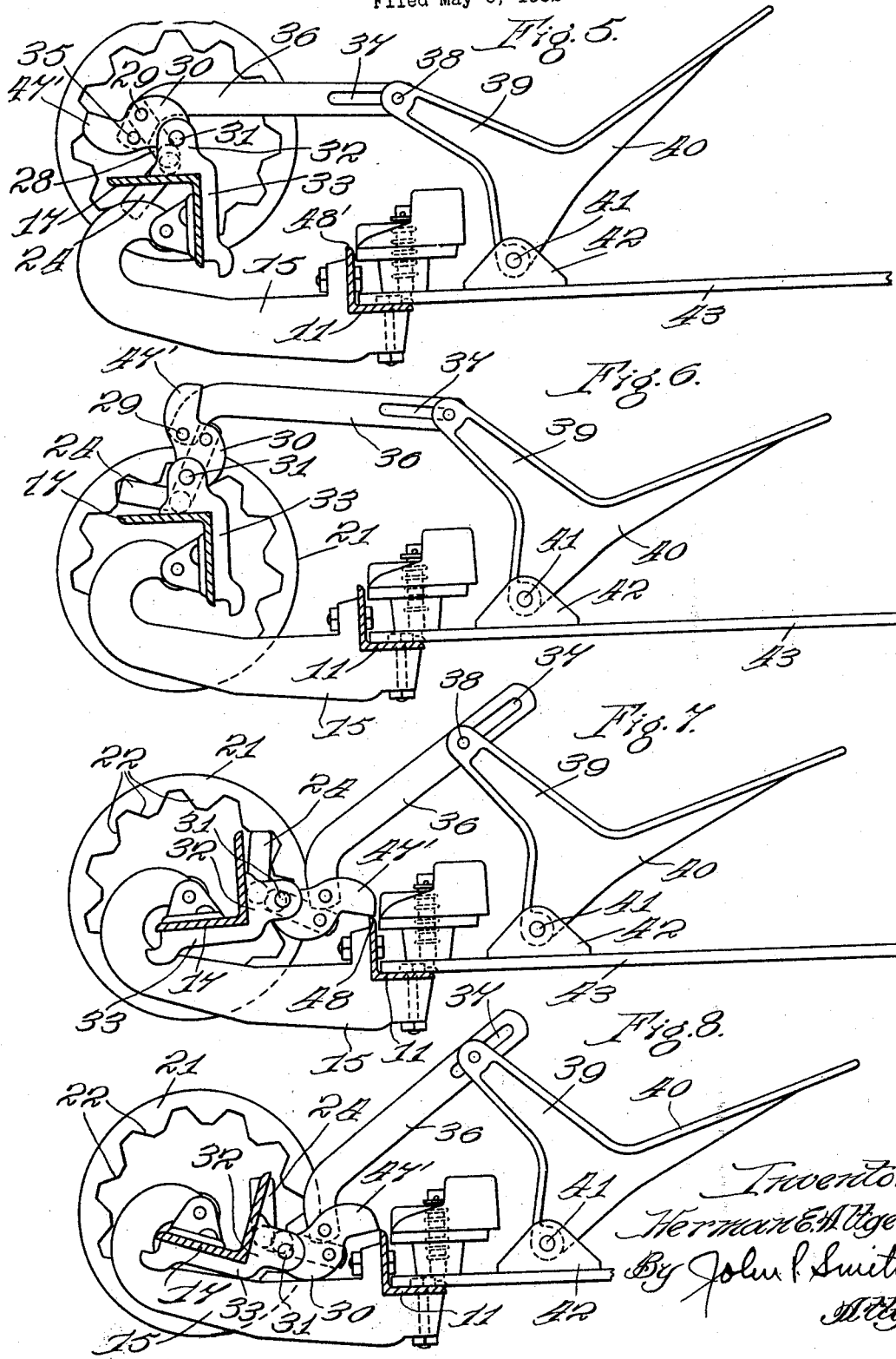

1,900,270

UNITED STATES PATENT OFFICE

HERMAN E. ALTGELT, OF SOUTH BEND, INDIANA, ASSIGNOR TO OLIVER FARM EQUIPMENT COMPANY, A CORPORATION OF DELAWARE

DUMP RAKE

Application filed May 9, 1932. Serial No. 610,025.

The present invention is directed generally to a dump rake, but more particularly to a simple and improved clutch mechanism for operatively connecting the drive wheels of the rake with the dump frame of the rake.

The primary object of the present invention is to provide a simple and improved construction of a dump rake mechanism in which the springs heretofore used for locking the clutch mechanism in its in and out position are eliminated.

A further object of the invention is to provide a novel and improved construction of a dump rake in which the parts thereof for operatively connecting the dump frame with the drive wheels thereof are reduced to a minimum.

These and other objects are accomplished by providing a construction and arrangement of the various parts in a manner hereinafter described and particularly pointed out in the appended claims.

Referring to the drawings, Fig. 1 is a top plan view of the conventional form of self dump rake having my invention embodied therein.

Fig. 2 is an enlarged fragmentary top plan view of the trip mechanism and its associated parts.

Fig. 3 is an enlarged cross sectional view taken on the lines 3—3 of Fig. 1.

Fig. 4 is an enlarged cross sectional view taken on the lines 4—4 of Fig. 1.

Fig. 5 is an enlarged vertical cross sectional view showing the position of the foot trip mechanism when the dump rake frame is in its normal raking position.

Fig. 6 is a similar view showing the position of the clutch rod engaging the clutch teeth formed on the hub of each of the wheels after the foot lever has been tripped.

Fig. 7 is a similar view showing the position of the dump frame in its extreme dump position just prior to the time when the clutch rod is about to be disengaged from the clutch hub of the wheel, and Fig. 8 is a similar view showing the manner in which the clutch rod is automatically disengaged from the clutch hub of the wheel.

In the self dump rakes that have been heretofore constructed it has been necessary to provide a spring or springs for normally holding the clutch rods in their disengaged position from the clutch hubs of the driving wheels and to hold these rods into clutching engagement when operatively connecting the drive wheels to the dumping frame, in order to affect a driving connection for dumping the rake. It is therefore one of the primary objects of the present invention to provide a novel arrangement in which the inner ends of each of the clutch rods are permitted to move eccentrically or laterally with respect to their outer ends so that this torque or twist of the clutch rods performs the function of a spring and thereby dispenses with the use of such a spring. Obviously such an arrangement simplifies the construction and reduces the number of parts necessary in the construction of a practical and efficient self dump rake.

In illustrating one form of my invention I have shown the same in connection with the conventional form of self dump rake which comprises briefly, a forwardly extending tongue generally indicated by the reference character 10, to the rear end of which is secured a relatively stationary frame construction comprising a transverse angle member 11, and a substantially U shaped angle frame member 12. Secured at spaced apart intervals and extending rearwardly are cleaner bars 13 which are held in proper spaced relation by a transverse rod 14 in a manner well understood in the art. Pivoted to the relatively stationary rake frame by means of hinge brackets 15 is a dump frame generally indicated by the reference character 16. The dump frame 16 comprises a transverse angle frame member 17, which has secured to the underside thereof, the usual arcuately curved spring raking fingers 18. Secured to the outer ends of the angle frame member 17 are axle brackets 18′ on which the hubs 19 of the wheels 20 are journalled. Each of the hubs 19 have inwardly projecting flange portions, as shown at 21, the inner peripheries of which are provided with ratchet or clutch teeth as shown at 22. The mechanism thus far described is substantially like the conventional form of self dump rake heretofore manufactured and used.

The essential feature of the present invention involves a simplicity of construction of the mechanism for operatively connecting the dump rake with the drive wheels of the same, and includes two clutch rods 23 which have their outer ends bent at right angles, as shown at 24, and are adapted to be actuated from the position shown in Fig. 5 or the non-clutching position, to the position shown in Fig. 6, in which the same is adapted to engage the clutch teeth 22 of the hubs 19. The outer ends of each of these rods 23 are journalled in bearings 24' formed integrally with the axle brackets 18'. The intermediate portions of these clutch rods 23 are journalled between hook portions 25 of the brackets 26 and the upper surface of the frame member 17, as clearly shown in Fig. 3 of the drawings. These brackets 26 are secured by means of bolts 27 to the frame member 17. The inner ends of these clutch rods 23 are flattened and bent upwardly and rearwardly at right angles to the main portions thereof, as shown at 28, and have their free ends pivotally connected by means of pins 29 to a pivoted lever 30. The lever 30 is pivoted as shown at 31, between two ears 32 of a bracket 33 which in turn is secured to the angle or frame member 17. Pivotally connected to the lever 30 in a recess 34 by means of a pin 35, is a link 36 which has its rear end curved, as clearly shown in Figs. 5 to 8 inclusive. The forward end of this link 36 is provided with a slotted aperture 37 through which a pin 38 extends for connecting the rear arm 39 of a foot lever trip or bell-crank 40. The lower end of the lever or trip 40 is pivoted on a pin 41 between the ears of a bracket 42 which in turn is secured to a draft plate 43. The rear end of the plate 43 is secured to the angle frame member 11 while the forward end of the same is secured to the forwardly extending portion of the angle member 12 by means of a draft strap 44.

The inner ends of each of the clutch rods 23, particularly that portion of these rods which extends inwardly of each of the pivoted brackets 25 moves eccentrically or laterally with respect to their normal longitudinal or pivotal axis on the angle frame member 17, and places the outer or clutch engaging end 24 of each of these rods under a torque or spring pressure into engagement with the co-operating clutch teeth 22 of each of the hubs 19 of the wheel when the lever is tripped from the position shown in Fig. 5 to that shown in Fig. 6. These portions of the rods 23 are confined or limited in their lateral or eccentric movement within the slotted recess 45 formed in the hooklike brackets 46, which in turn are secured to the angle frame member 17 adjacent each of the crank or arm portions 28 of the rods 23 by means of a bolt 47. Extending outwardly from the free end of the lever 30 on one side thereof is a trip lug 47', which is adapted to strike the upper edge, as shown at 48, of the frame member 11 to release the ratchet engaging portion 24 of each of the rods 23 from the clutch teeth 22 of the clutch hubs 19, in the manner clearly shown in Figs. 7 and 8 of the drawings. The rake of course, is provided with the usual hand operating dump lever 48' which is connected up in the usual manner with the dump frame for operatively dumping the rake by hand if the operator so desires.

The operation of my improved self dump rake is as follows: Let us assume that the dump frame is in its down or normal raking position with the operative parts, together with the clutch mechanism, in the position shown in Figs. 1 and 5 of the drawings. If the operator desires to dump the rake, the foot lever 40 is pressed forwardly from the position shown in Fig. 5 to the position shown in Fig. 6. This movement of the trip lever forwardly moves the links 36 forwardly, thereby swinging the lever bracket 30 forwardly about its pivot 31 on the bracket 33 to the position shown in Fig. 6. As the lever 30 is moved forwardly, the inner crank ends 28 of the clutch rods 23 are swung forwardly and eccentrically with respect to their outer bearings in the bearings 24' and 26. This eccentric or lateral movement of the inner ends of the clutch rods 23 places the outer ends under a torque or spring tension to thereby place the clutch ends 24 of each of these rods in a position to press them against the clutch teeth 22 of each of the hubs 19 of the wheel. As the whole rake is moved forwardly, the dump frame is actuated from the position shown in Fig. 6 to the position shown in Fig. 7, in which latter position the automatic trip lug 47' engages the upper edge of the angle frame member 11, as shown at 48 in Fig. 7. A continued rotation of the wheels move the operative parts to the position shown in Fig. 8, in which the lever member 30 is actuated about its pivot 31 in a rearwardly or upwardly direction, carrying with it the inner ends 28 of the clutch rods 23, thereby unlatching or unclutching the outer clutch ends 24 from the clutch teeth 22 of the hubs of the wheels. At the conclusion of this unclutching operation, the weight of the dump frame returns the rake to its normal raking position or the position shown in Figs. 1 and 5 of the drawings.

From the above specification it will be seen that I have provided a simple and efficient as well as economical construction of a self dump rake, and one in which the parts are reduced to a minimum in that the springs are not utilized to affect the actuation of the clutching mechanism for operatively connecting the wheels with the dump frame, as has been used heretofore in the conventional form of self dump rake.

While in the above specification I have described one embodiment which my invention may assume in practice, it will of course, be understood that the same is capable of modification, and that modification may be made without departing from the spirit and scope of the invention as expressed in the following claims.

What I claim as my invention and desire to secure by Letters Patent is:

1. A self dump rake comprising a relatively stationary frame, a dump frame pivoted to said stationary frame, wheels for supporting said rake frame, clutch rods carried by said dump frame, and means connected to the inner ends of said clutch rods to move them eccentrically with respect to their outer ends for operatively connecting the wheels with said dump frame for actuating the same.

2. A self dump rake comprising a relatively stationary frame, a dump frame pivoted to said stationary frame, wheels for supporting said rake frame, clutch rods carried by said dump frame, and adapted to operatively connect said wheels with said dump frame, the inner ends of said rods being movable eccentrically with respect to the outer ends of said rods for placing said rods under a torque tension, and means for connecting the inner ends of said rods for moving them eccentrically with respect to the outer ends whereby the outer ends of said clutch rods are rotated into clutching engagement with said wheels for operatively connecting said wheels with said dump frame.

3. A self dump rake comprising a relatively stationary frame, a dump frame pivoted to said stationary frame, wheels journalled on the outer ends of said dump frame, two transversely extending clutch rods having their outer ends adapted to be operatively connected with said wheels and their inner ends to move eccentrically with respect to their outer ends, a lever bracket pivoted to said dump frame and connected to the inner ends of said clutch rods, and a foot lever trip pivoted to said stationary frame and connected to said lever bracket for actuating the inner ends of said clutch rods eccentrically with respect to the outer ends thereof for operatively connecting said wheels to said dump frame.

4. A self dump rake comprising a relatively stationary frame, a dump frame pivoted to said stationary frame, wheels journalled on the outer ends of said dump frame, said wheels being provided with clutch hubs, two transversely extending clutch rods having their outer ends bent at right angles and adapted to engage the clutch hubs of each of said wheels, the inner ends of said clutch rods being bent at right angles and adapted to move eccentrically with respect to the outer ends thereof for placing the outer ends under a torque tension in clutching engagement with said clutch hubs, a lever bracket pivoted to the dump frame in the center thereof and pivotally connected to the inner ends of said clutch rods, a pivoted foot lever carried by said stationary frame, a loose link connection connecting said foot lever to said lever bracket whereby on the actuation of said foot trip the inner ends of said clutch rods will move eccentrically with respect to the outer ends thereof for placing the outer ends of said clutch rods under pressure and in engagement with the clutch hubs of said wheels, and a lug formed integrally with said lever bracket adapted to engage said stationary frame for automatically disengaging said clutch rods from said clutch hubs at the conclusion of the dumping operation of said dump frame.

5. A self dump rake comprising a relatively stationary frame, a dump frame pivoted to said stationary frame, wheels journalled on the outer ends of said dump frame, longitudinally extending clutch rods pivoted to said dump frame having the outer ends thereof bent at right angles and adapted to engage the clutch hubs of said wheels, a lever bracket pivoted to said dump frame in the center thereof and having the free end thereof pivotally connected to right angularly bent portions formed on the inner ends of said clutch rods for moving the inner ends of said clutch rods eccentrically with respect to the outer ends thereof, a foot trip lever in the form of a bell-crank pivoted to said stationary frame, and a curved lost motion connection connecting said foot trip to said lever bracket whereby on the actuation of said foot lever the inner ends of said clutch rods are moved eccentrically with respect to the outer ends thereof for placing the clutch ends of said rods under a tension for operatively connecting the drive wheels of said rake with said dump frame.

In testimony whereof I have signed my name to this specification, on this 5th day of May A. D. 1932.

HERMAN E. ALTGELT.